United States Patent
Becker et al.

(10) Patent No.: US 10,265,861 B2
(45) Date of Patent: Apr. 23, 2019

(54) GRIPPING DEVICE

(71) Applicant: SCHUNK GMBH & CO. KG SPANN-UND GREIFTECHNIK, Lauffen am Neckar (DE)

(72) Inventors: Ralf Becker, Marbach (DE); Jens Wolfarth, Bad Mergentheim (DE)

(73) Assignee: SCHUNK GMBH & CO. KG SPANN-UND GREIFTECHNIK, Lauffen am Neckar (DE)

( * ) Notice: Subject to any disclaimer, the term of this patent is extended or adjusted under 35 U.S.C. 154(b) by 0 days.

(21) Appl. No.: 15/762,820

(22) PCT Filed: Sep. 2, 2016

(86) PCT No.: PCT/EP2016/070781
§ 371 (c)(1),
(2) Date: Mar. 23, 2018

(87) PCT Pub. No.: WO2017/050545
PCT Pub. Date: Mar. 30, 2017

(65) Prior Publication Data
US 2018/0290309 A1 Oct. 11, 2018

(30) Foreign Application Priority Data
Sep. 25, 2015 (DE) .......... 10 2015 218 523

(51) Int. Cl.
*B25J 15/00* (2006.01)
*B25J 15/10* (2006.01)
(Continued)

(52) U.S. Cl.
CPC ....... *B25J 15/0009* (2013.01); *B25J 15/0052* (2013.01); *B25J 15/06* (2013.01); *B25J 15/08* (2013.01); *B25J 15/10* (2013.01)

(58) Field of Classification Search
CPC ............... B25J 15/0009; B25J 15/0033; B25J 15/0052; B25J 15/0061; B25J 15/009; B25J 15/0608; B25J 15/10; A61F 2/588
(Continued)

(56) References Cited

U.S. PATENT DOCUMENTS 3,651,957 A * 3/1972 Ball .................. H01L 21/67144
294/106
4,606,484 A * 8/1986 Winter ..................... A46B 5/00
224/218
(Continued)

FOREIGN PATENT DOCUMENTS

DE 102013113375 A1 12/2014
FR 2979564 A3 3/2013

OTHER PUBLICATIONS

International Search Report and Written Opinion Form PCT/ISA/210 and PCT/ISA/237, International Application No. PCT/EP2016/070781, pp. 1-10, International Filing Date Sep. 2, 2016, mailing date of search report dated Nov. 21, 2016.

*Primary Examiner* — Dean J Kramer
(74) *Attorney, Agent, or Firm* — Bond Schoeneck & King, PLLC; George McGuire

(57) ABSTRACT

The invention relates to a gripping device, including a base part and gripping fingers for gripping gripping components, which gripping fingers are movably arranged on the base part, characterized in that a clamping device is additionally provided on the base part, which clamping device interacts with at least one holding segment provided on a clamping component in order to fasten the clamping component to the base part.

7 Claims, 4 Drawing Sheets

(51) Int. Cl.
*B25J 15/06* (2006.01)
*B25J 15/08* (2006.01)

(58) Field of Classification Search
USPC .................. 294/2, 65.5, 213; 623/64, 65
See application file for complete search history.

(56) References Cited

U.S. PATENT DOCUMENTS

| | | | | |
|---|---|---|---|---|
| 4,840,416 | A * | 6/1989 | Jacobsen | B23Q 1/0018 294/195 |
| 5,360,249 | A * | 11/1994 | Monforte | B25J 15/0475 294/119.1 |
| 5,588,794 | A | 12/1996 | Panyard | |
| 7,044,706 | B2 * | 5/2006 | Jung | B25J 15/0052 294/119.1 |
| 7,618,074 | B2 * | 11/2009 | Zimmer | G01R 31/2893 294/183 |
| 7,735,887 | B2 * | 6/2010 | Matsuda | B25J 15/0009 294/106 |
| 2008/0145188 | A1 * | 6/2008 | Kamphuis | B25J 15/0052 414/14 |
| 2009/0194922 | A1 * | 8/2009 | Lin | B25J 15/0052 269/55 |
| 2012/0059517 | A1 | 3/2012 | Nomura | |

\* cited by examiner

GRIPPING DEVICE

CROSS-REFERENCE TO RELATED APPLICATIONS

This application is the United States National Phase Entry of PCT Application No. PCT/EP2016/070781 filed Sep. 2, 2016, which claims priority to German Application No. 10-2015-218523.0 (DE), filed Sep. 25, 2015, the entire disclosure of each of which is incorporated herein by reference.

BACKGROUND OF THE INVENTION

The invention relates to a gripping device comprising a base part and gripping fingers for gripping gripping components, which gripping fingers are movably arranged on the base part.

Various gripping devices of this kind are known. Two-finger parallel grippers or three-finger centric grippers, for example, are considered gripping devices. Anthropomorphic gripping devices are likewise known, which simulate a human hand and comprise an assembly of movable gripping fingers which correspond to human fingers.

Gripping devices of this kind are primarily used for receiving, retaining, relocating or moving components. It has been found that it is difficult to grip relatively heavy components using relatively small gripping devices. In particular, relatively high grip forces are required for this purpose. Securely gripping and handling, between the gripping fingers, components which have a specific weight, which have a center of gravity positioned outside an imaginary line between the gripping fingers and/or on which greater or unpredictable external forces act when handled, is difficult even for anthropomorphic grippers. Gripping pans or pots, for example, has proved problematic in particular for anthropomorphic grippers which are used in kitchen robots, for example. Even gripping bread knives, for example, and using said knives to cut bread is problematic.

A gripping device having a disc secured by means of a screw connection is known from FR 2 979 564 A3.

SUMMARY OF THE INVENTION

The object of the present invention is that of providing a gripping device of the kind mentioned at the outset which overcomes the aforementioned disadvantages.

This object is achieved by a gripping device characterized in that a clamping device is additionally provided on the base part, which clamping device interacts with a holding segment provided on a clamping component in order to fasten the clamping component to the base part. In addition to the gripping fingers, the gripping device therefore also comprises a clamping device which can be actuated independently of the gripping fingers. In particular, gripping components, which are characterized by having no holding segments to interact with the clamping device, can be gripped by the gripping fingers. A grip of this kind is in particular advantageous for relatively small and light components. When large or heavy components must be gripped, the grip force by means of which the gripping fingers are loaded against the component is often not sufficient. Components of this kind, which are designed as clamping components, can be fastened to the base part using the clamping device provided on the base part, and can thus be handled. Clamping components of this kind are therefore characterized in that they provide holding segments, which are suitable for interacting with the clamping device provided on the base part. Depending on the component to be handled, said component can therefore be gripped by the gripping device between the gripping fingers or fastened to the clamping device on the base part.

The clamping device can in particular interact with the holding segment in a positively engaging manner, such that forces can be conveyed to the base part by means of the clamping device and the holding segment.

In this case, it is advantageous for the clamping device to comprise movable locking elements which latch onto the holding segment(s) in a locking position in order to fasten the clamping component to the base part, and which release the holding segment(s) in a release position in order to detach the clamping component from the base part. Providing locking elements of this kind thus allows mechanical locking of each clamping component to the base part, by means of which locking in particular even relatively heavy clamping components can be securely handled by the gripping device.

It is advantageous to provide spring elements which force the locking elements into the locking position or the release position and/or to provide drive means which can move the locking elements into the release position or the locking position. In particular, it has been found to be advantageous for the locking elements to be forced into the locking position by the spring elements. The locking elements can be actuated into the release position in particular in a mechanical, electromagnetic, pneumatic or fluidic manner.

It is particularly advantageous for the locking elements to be designed such that they are first forced out of the locking position into the release position by the holding segments, for example counter to the spring force of the spring element, when the clamping component is fastened to the gripping device. It is advantageous if the locking elements automatically snap or click into said locking position when a fastening end position is reached. This can in particular be caused by the spring force of the spring elements. When the locking elements snap or click into place, they can, as previously mentioned, latch onto the holding segments on the side of the clamping element in a preferably secure manner.

In order to also achieve a secure arrangement of the clamping components on the base part, it is also advantageous for the locking elements to be designed such that they load the clamping component against the base part when said locking elements are in the locking position. The base part can further comprise a contact surface on which the clamping component can come to rest in a precisely positioned manner.

The clamping device as such can also be designed as a magnetic clamping device. The holding segments can be fastened to the base part by means of magnetic forces. This has the advantage that no mechanically movable components must be provided for fastening the clamping component to the base part.

In this case, it is advantageous for the magnetic forces to be provided by permanent magnets and for the magnetic forces to be compensated by electromagnetic fields in order to detach the clamping component from the base part. The electromagnetic fields can in particular be generated by electromagnets provided in or on the base part. By supplying a corresponding current to the electromagnets, the magnetic field generated by the permanent magnets can be neutralized, whereby the clamping component can be detached from the base part.

The clamping device can also be designed as a suction clamping device, the holding segments being fastened by forces provided by negative or positive pressure. It is in particular conceivable for the clamping component to be fastened to the base part by means of negative pressure.

It is also conceivable for the clamping device to be designed as a bayonet clamping device in which, in order to carry out the clamping process, the holding segment is moved first along a straight line, which preferably extends orthogonally with respect to the surface of the portion of the base part which comprises the clamping device, and then about a rotational axis into a locking position.

The clamping device as such can in particular comprise a clamping receptacle for receiving a clamping projection, which is provided on the component to be fastened and which comprises the holding segment. The clamping projection is then inserted into the clamping receptacle and locked there in order to fasten the clamping component. The locking can in particular be carried out using locking elements, as has been set out. However, magnetic or pneumatic locking in particular is also possible.

It is however conceivable for the clamping mechanism to comprise a clamping projection for engaging in a clamping receptacle provided on the clamping component to be fastened. This is in particular advantageous if the clamping component is not intended to comprise a projection, for example so that said component can also be handled manually. In this case, the clamping projection, together with, for example, locking elements which are to be provided, is arranged on the base part.

As mentioned at the outset, the gripping device according to the invention is in particular designed as an anthropomorphic gripper. The gripping fingers are each formed by one, or preferably more, finger elements. The base part can comprise a palm portion, the clamping device being provided in or on the palm portion. An anthropomorphic gripping device of this kind can be used in particular in the context of service robots, such as kitchen robots. Objects such as pots, pans, knives or the like can be handled by robots of this kind, something which cannot be accomplished using the gripping fingers. Providing a clamping device on the palm portion therefore has the advantage that even larger or heavier objects can be securely fastened to the gripping device and thus be securely handled.

The object mentioned at the outset is also achieved by a gripping system which comprises a gripping device according to the invention and a corresponding clamping component, the clamping component comprising holding segments which interact with the clamping device. The system is thus characterized in that the clamping components can be securely fastened to the gripping device, and handled thereon, by providing corresponding holding segments.

Further details and advantageous embodiments of the invention can be found in the following description, on the basis of which various embodiments of the invention are described in more detail.

DETAILED DESCRIPTION

Figure 1:
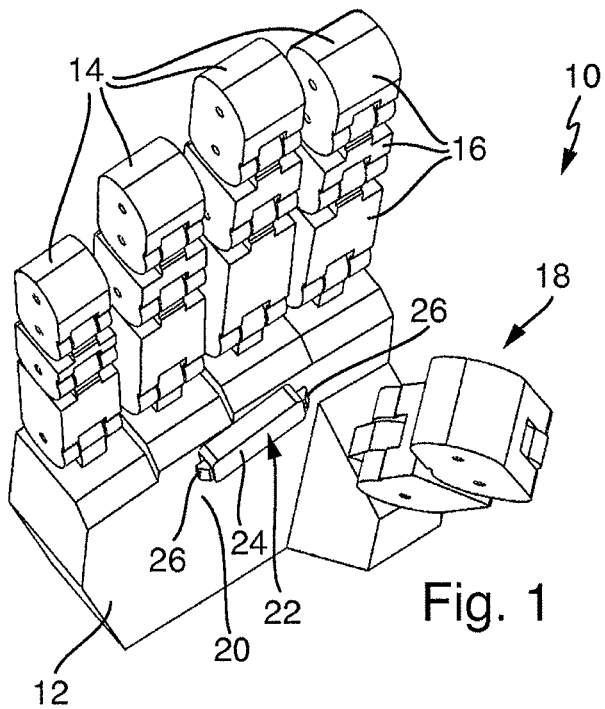
FIG. 1 and FIG. 2 are different views of a gripping device according to the invention.
Figure 2:
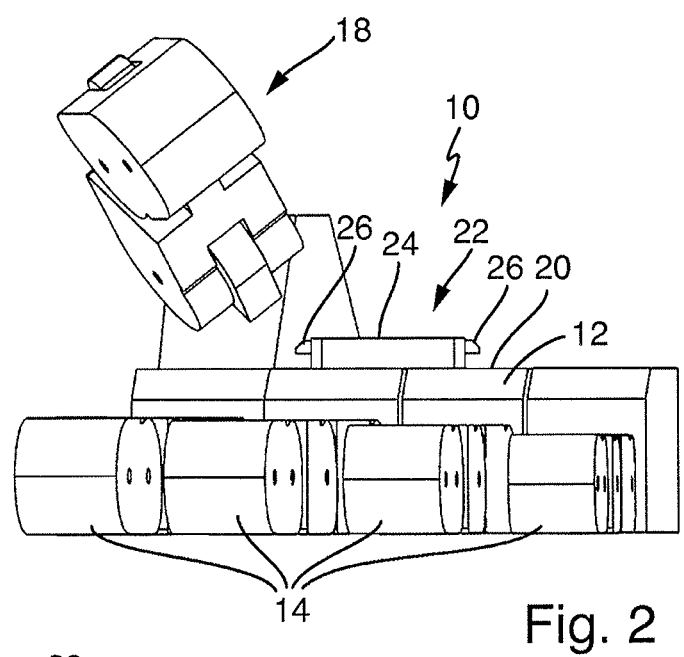

The gripping device 10 shown in FIGS. 1 and 2 is designed as an anthropomorphic gripper modelled on a human hand. A total of four gripping fingers 14, extending in parallel with one another, are provided on a base part 12, which gripping fingers each comprise three finger elements 16 which are arranged so as to be movable relative to one another. A further gripping finger 18 is also provided on the base part 12, which gripping finger is intended to correspond to the human thumb.

The base part 12 comprises a palm portion 20 on the side of the base part 12 on which the gripping finger 18 is provided. As is clear in FIGS. 1 and 2, a clamping device 22 is provided on the palm portion 20. The clamping device 22 is designed as a clamping projection, i.e. the clamping device is provided on the palm portion 20 and protrudes therefrom. The clamping device 22 comprises a cuboid housing 24 in which two locking elements 26 are provided, which can be moved toward and away from one another. Spring elements are provided in the housing 24, which spring elements force the locking elements 26 axially outwards and away from one another. The locking elements 26 can then be moved toward one another counter to the spring force of said spring elements. Drive means (not shown) are also provided, by means of which the locking elements can be moved out of the locking position shown in FIGS. 1 and 2 into a release position, in which release position the locking elements are displaced toward one another in the housing 24. The drive means can be electrical, mechanical, pneumatic or fluidic, for example.

Figure 3:
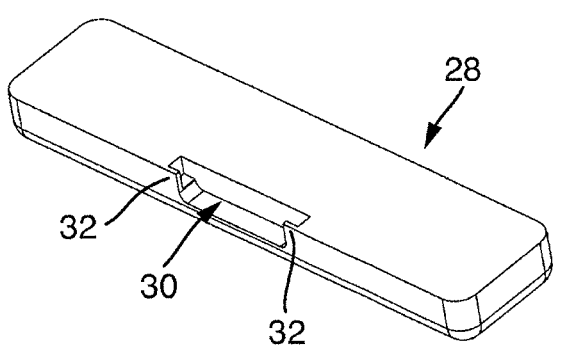
FIG. 3 shows a clamping component.

FIG. 3 shows a clamping component 28 which is to be handled by the gripping device 10. Said clamping component 28 comprises a holding segment 30 in the form of a clamping receptacle, which is provided for interacting with the clamping device 22. The holding segment 30 comprises two latching portions 32 which are latched onto by the locking elements 26, when said portions are fastened to the base part 12, as shown in FIG. 4.

Figure 4:
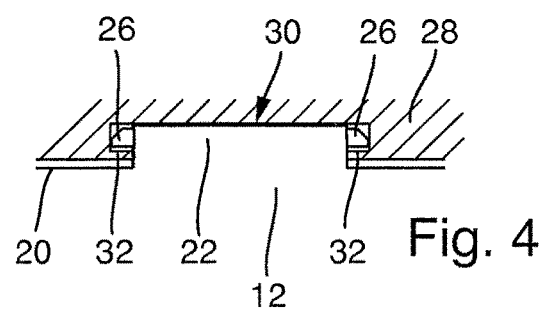
FIG. 4 is detail of a section through the clamping component, as shown in FIG. 3, in the fastening end position.

The locking elements 26 are designed so as to be wedge-shaped on the upper face thereof which faces away from the palm portion 20, such that, when the gripping device 10 or the clamping device 22 moves into the holding segment 30, said locking elements are forced out of the locking position shown in FIGS. 1 and 2, counter to the spring force of the spring elements, toward one another into a release position, and such that the spring pretension causes said locking elements to automatically click into the locking position when the fastening end position shown in FIG. 4 is reached. In this way, the clamping component 28 is securely fastened to the base part 12.

As already mentioned, in order to detach the clamping component 28, the locking elements 26 can be moved toward one another using the drive means, whereby said locking elements engage in the housing 24. The clamping device 22 can thereby be moved out of the holding segment 30.

As a result of the cuboid design of the clamping device 22 and the corresponding complementary design of the holding segment 30, a positive engagement occurs between the clamping device and the holding segment. Transverse forces and moments can thus be securely absorbed into the base part from the component to be gripped.

Figure 5:
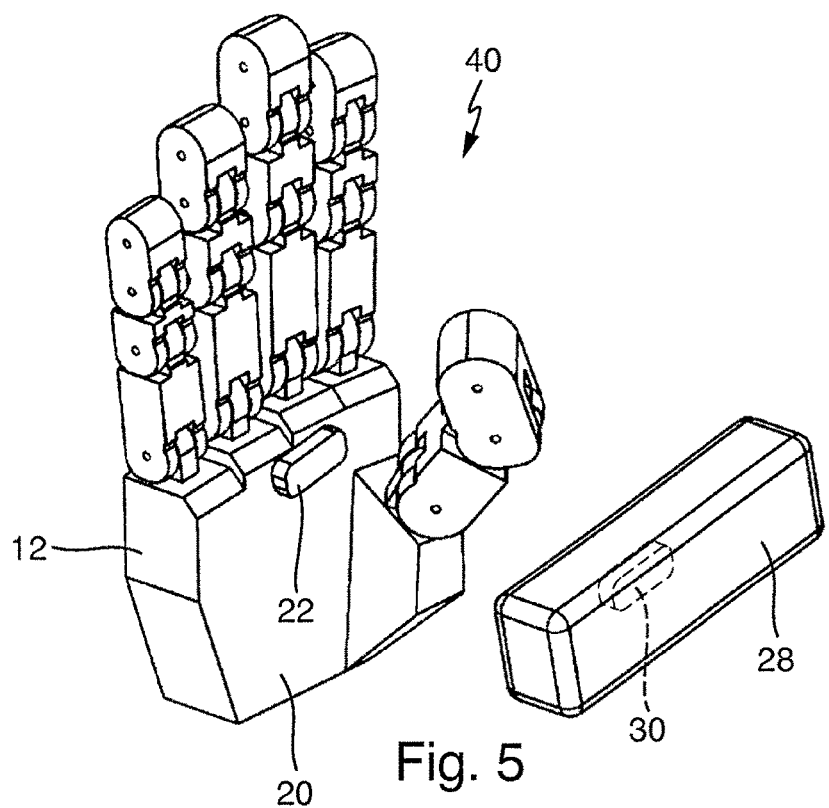
FIG. 5 shows a second gripping device according to the invention and a clamping component.
Figure 6:
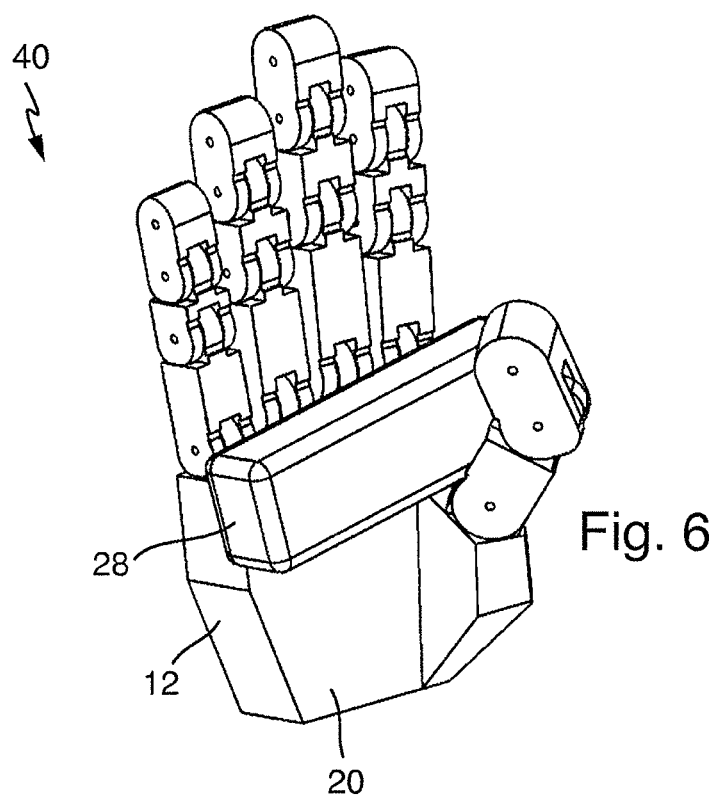
FIG. 6 shows the gripping device according to FIG. 5 having a clamping component fastened thereto.

The gripping device 40 shown in FIGS. 5 and 6 corresponds to the gripping device 10, corresponding components being denoted by corresponding reference signs. In contrast to the gripping device 10, in the gripping device 40 the clamping device 22 is designed as a magnetic clamping device. In this case, the clamping device 22 comprises a relatively strong permanent magnet which interacts with a ferromagnetic holding segment 30 which is provided on the clamping component 28. In order to fasten the clamping component 28 to the base part 12, the clamping device 22 therefore engages in the holding segment 30, which is designed as a clamping receptacle. The clamping component 28 is then fastened by means of magnetic forces. In order to detach the fastened clamping component, it is conceivable for electromagnets to be provided in the clamping device 22 or in the base part 12, by means of which electromagnets electromagnetic fields can be generated, which compensate or neutralize the magnetic forces which fasten the clamping component 28 to the base part 12. The clamping component 28 can then be detached from the gripping device 10.

Figure 7:
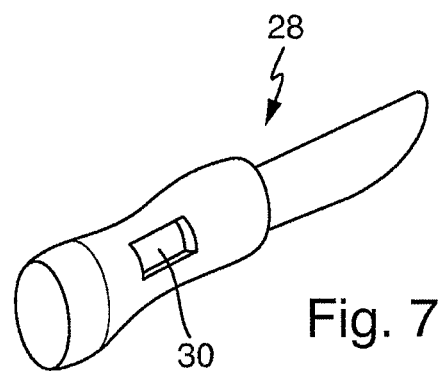
FIG. 7 shows a clamping component in the form of a kitchen knife.

FIG. 7 shows a clamping component 28 which is designed as a knife. The holding segment 30 which, depending on the embodiment, interacts either with the gripping device 10 or with the gripping device 40 in order to fasten the clamping component 28, is clearly shown.

Figure 8:
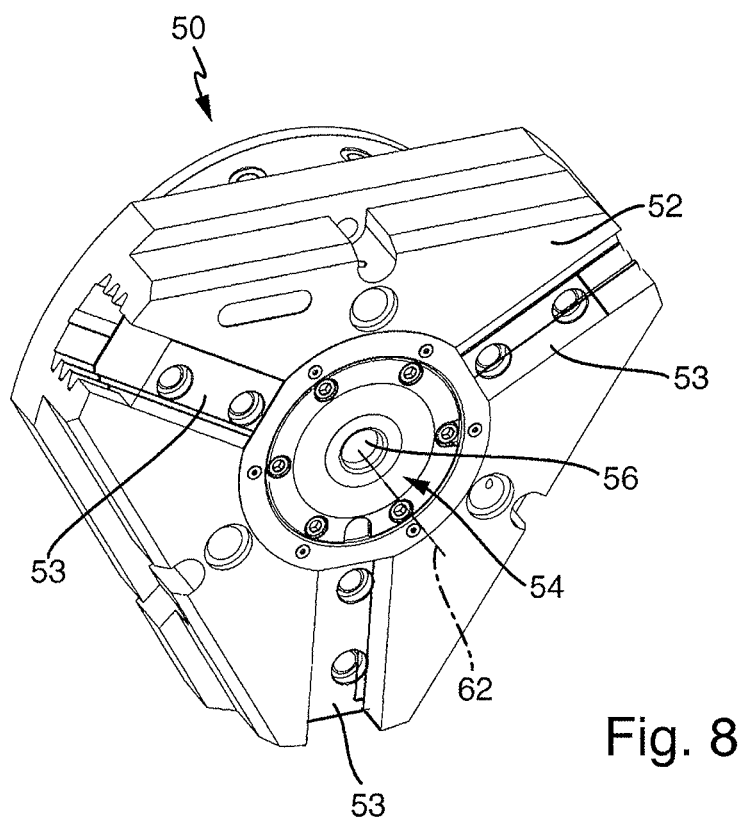
FIG. 8 shows a third gripping device according to the invention in the form of a centric gripper.
Figure 9:
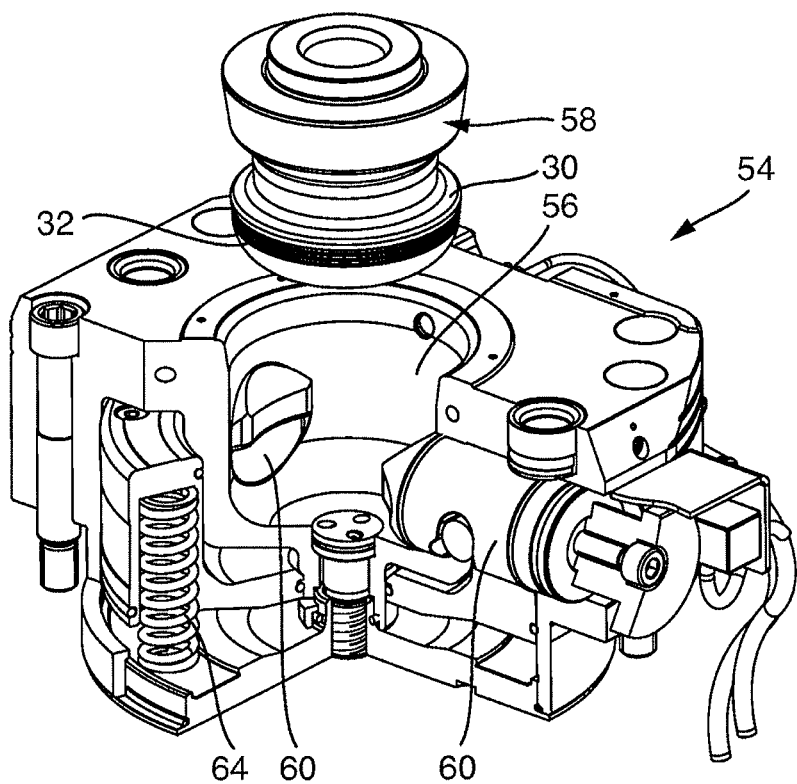
FIG. 9 is a view of the clamping device shown in FIG. 8 as an individual component.

FIG. 8 shows a further gripping device 50 which is designed as a three jawed centric gripper. A total of three jaws 53, which can be moved toward and away from one another, are provided in a base part 52, on which jaws gripping fingers (not shown) can be arranged for gripping gripping components. In the base part 52, the gripping device 50 comprises a clamping device 54, which has a clamping receptacle 56. As shown in FIG. 9, a clamping bolt 58 can be inserted into said clamping receptacle 56 and locked using locking elements 60.

The clamping bolt 58 can be arranged on a clamping component and forms the holding segment 30 of the clamping component, which holding segment interacts with the clamping device 54.

As can be seen in FIG. 8, the clamping device 54 is arranged centrally in the base part 52, the central longitudinal axis 62 of the clamping receptacle 54 being positioned on the intersection of the movement axes of the clamping jaws 53.

The locking elements 60 are forced radially inwards into a locking position by spring elements 64 and a corresponding mechanism. When the clamping bolt 58 is inserted into the clamping receptacle 56, the locking elements 60 are moved away from one another, counter to the force of the spring elements 64, and, in the locking position, latch behind the latching portion 32 of the clamping bolt 58. In order to move the locking element 60 into a release position, pneumatic drive means, which are not described in more detail, are in particular provided.

The gripping devices 10, 40 and 50 are advantageous in that not only can said devices can grip small and light components, but components which are relatively heavy or bulky can also be securely fastened to the gripping device by means of the clamping device 22, 54.

What is claimed is:

1. Anthropomorphic gripping device comprising a base part with a palm portion, a clamping component having at least one holding segment, a clamping device, and gripping fingers for gripping components, which gripping fingers are movably arranged on the base part, wherein the gripping fingers each consist of at least one finger element, wherein the clamping device is positioned in or on the palm portion and comprises movable locking elements and is adapted to be actuated independently of the gripping fingers during operation of the gripping device and interact with the at least one holding segment provided on a clamping component in order to fasten the clamping component to the base part, wherein the locking elements are designed such that clamping component is loaded against the palm portion in a locking position, wherein the palm portion comprises a contact surface on which the clamping component fastened to the palm portion can come to rest, whereby, depending on the component which is to be handled, said component can be gripped between the gripping fingers or fastened to the palm portion by means of the clamping device.

2. Gripping device according to claim 1, characterized in that the clamping device comprises movable locking elements which latch onto the holding segment in a locking position in order to fasten the clamping component to the base part, and which release the holding segment in a release position in order to detach the clamping component from the base part.

3. Gripping device according to claim 1, characterized in that spring elements are provided which force the locking elements into the locking position or a release position and/or in that drive means are provided which can move the locking elements into the release position or the locking position.

4. Gripping device according to claim 1, characterized in that the locking elements are designed such that said locking elements are first forced out of the locking position into a release position by the holding segment when the clamping component is fastened to the gripping device, and in that said locking elements then snap or click into the locking position when a fastening end position is reached.

5. Gripping device according to claim 1, characterized in that the clamping device comprises a clamping projection for engaging in a clamping receptacle provided on the clamping component.

6. Gripping device according to claim 1, characterized in that the clamping device interacts with the holding segment in a positively engaging manner, such that forces and moments can be conveyed to the base part by means of the clamping device and the holding segment.

7. Gripping system comprising a gripping device according to claim 1 and a clamping component, wherein the clamping component comprises at least one holding segment which interacts with the clamping device.

* * * * *